(12) United States Patent
Alvarez et al.

(10) Patent No.: US 12,534,213 B2
(45) Date of Patent: Jan. 27, 2026

(54) PROPULSION ASSEMBLY FOR AN AIRCRAFT, HAVING AN EXTRACTION FAN

(71) Applicant: Airbus Operations SAS, Toulouse (FR)

(72) Inventors: Franck Alvarez, Toulouse (FR); Olivier Verseux, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/043,583

(22) Filed: Feb. 3, 2025

(65) Prior Publication Data

US 2025/0250019 A1 Aug. 7, 2025

(30) Foreign Application Priority Data

Feb. 5, 2024 (FR) ...................................... 2401088

(51) Int. Cl.
| | | |
|---|---|---|
| *B64D 27/355* | (2024.01) | |
| *B64D 29/00* | (2006.01) | |
| *B64D 33/00* | (2006.01) | |
| *H01M 8/04014* | (2016.01) | |
| *H01M 8/04223* | (2016.01) | |
| *H01M 8/04746* | (2016.01) | |

(52) U.S. Cl.
CPC ........... *B64D 33/00* (2013.01); *B64D 27/355* (2024.01); *B64D 29/00* (2013.01); *H01M 8/04014* (2013.01); *H01M 8/04231* (2013.01); *H01M 8/04776* (2013.01); *H01M 2250/20* (2013.01)

(58) Field of Classification Search
CPC .... B64D 27/355; B64D 33/08; B64D 35/021; H01M 2250/20
See application file for complete search history.

(56) References Cited

U.S. PATENT DOCUMENTS

| | | | | |
|---|---|---|---|---|
| 11,866,185 | B2* | 1/2024 | Labarthe | ........... H01M 8/04014 |
| 11,945,593 | B2* | 4/2024 | Kierbel | ................ B64D 37/04 |
| 11,952,134 | B2* | 4/2024 | Carretero Benignos | .................... B64D 27/31 |
| 12,054,266 | B2* | 8/2024 | Cottrell | ................ B64D 35/021 |
| 2020/0140062 | A1 | 5/2020 | Bar Yohai et al. | |

(Continued)

FOREIGN PATENT DOCUMENTS

| | | |
|---|---|---|
| EP | 4067236 A1 | 10/2022 |
| EP | 4086176 A1 | 11/2022 |
| WO | 2023114353 A2 | 6/2023 |

OTHER PUBLICATIONS

French Search Report and Written Opinion for corresponding French Patent Application No. 2401088 dated Jul. 30, 2024.

*Primary Examiner* — Brian M O'Hara
(74) *Attorney, Agent, or Firm* — Greer, Burns & Crain, Ltd.

(57) ABSTRACT

An aircraft propulsion assembly that has a nacelle with a front opening and a rear opening, a propeller driven by an electric motor, a fuel cell supplying the electric motor with electric current, an inner channel arranged in the nacelle between the front opening and the rear opening. The electric motor and the fuel cell are disposed in the inner channel. A motorized fan is arranged at the rear part so as to draw in the air present in the inner channel and expel it to the outside through the rear opening. A control unit controls the motorized fan. With such an arrangement, the outside air cools the inside of the nacelle and the dihydrogen is evacuated.

6 Claims, 3 Drawing Sheets

(56) References Cited

U.S. PATENT DOCUMENTS

| | | |
|---|---|---|
| 2021/0269152 A1* | 9/2021 | Wankewycz ............ B60L 8/003 |
| 2022/0306306 A1 | 9/2022 | Labarthe et al. |
| 2022/0355943 A1 | 11/2022 | Carretero Benignos et al. |
| 2024/0359802 A1* | 10/2024 | Kierbel ................ B64D 27/355 |

* cited by examiner

PROPULSION ASSEMBLY FOR AN AIRCRAFT, HAVING AN EXTRACTION FAN

CROSS-REFERENCES TO RELATED APPLICATIONS

This application claims the benefit of French Patent Application Number 2401088 filed on Feb. 4, 2024, the entire disclosure of which is incorporated herein by way of reference.

FIELD OF THE INVENTION

The present invention relates to a propulsion assembly for an aircraft, the propulsion assembly having a nacelle, a channel passing through the nacelle from the front to the rear, and a fan arranged at the rear so as to draw in and evacuate the air from the channel toward the outside, and to an aircraft having at least one such propulsion system.

BACKGROUND OF THE INVENTION

In order to move, an aircraft conventionally has at least one propulsion assembly. In order to reduce polluting emissions, a propulsion assembly is equipped with an electric motor that drives a propeller in rotation. In the nacelle, various elements ensuring the operation of the propulsion assembly, such as the motor, electric generators, for example dihydrogen fuel cells, are enclosed in the nacelle.

In such a nacelle, it is necessary to provide cooling means, in particular for the electric generators and the motor, and means for evacuating the dihydrogen in the event of a leak, in particular when the aircraft is on the ground and the movement of the aircraft cannot be relied on.

SUMMARY OF THE INVENTION

An object of the present invention is to propose a propulsion assembly that has means for cooling the inside of the nacelle and evacuating the dihydrogen, in particular when the aircraft is on the ground.

To that end, a propulsion assembly for an aircraft is proposed, having:
- a nacelle extending between a front part and a rear part, wherein the nacelle has a front opening at the front part and a rear opening at the rear part,
- a propeller mounted so as to be able to move in rotation in front of the nacelle,
- an electric motor arranged to drive the propeller in rotation,
- a fuel cell generating an electric current for the electric motor from dihydrogen,
- an inner channel arranged in the nacelle and extending between the front opening and the rear opening, wherein the electric motor and the fuel cell are disposed in the inner channel,
- a motorized fan arranged at the rear part so as to draw in the air present in the inner channel and expel it to the outside of the nacelle through the rear opening, and
- a control unit arranged to command the starting and stopping of the motorized fan.

With such an arrangement, the outside air cools the inside of the nacelle, and the dihydrogen is evacuated.

Advantageously, the nacelle has a lateral opening, and the propulsion assembly has an additional channel extending between the lateral opening and the inner channel and progressing from the front toward the rear of the nacelle.

Advantageously, the propulsion assembly has a door mounted so as to be able to move between a closed position in which it shuts off the lateral opening and an open position in which it does not shut off the lateral opening and actuation means controlled by the control unit and arranged to move the door alternately from the open position to the closed position.

Advantageously, the propulsion assembly has at least one heat exchanger mounted in the additional channel.

Advantageously, the propulsion assembly has at least one heat exchanger mounted in the inner channel.

The invention also proposes an aircraft having at least one propulsion assembly according to one of the preceding variants.

BRIEF DESCRIPTION OF THE DRAWINGS

The above-mentioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
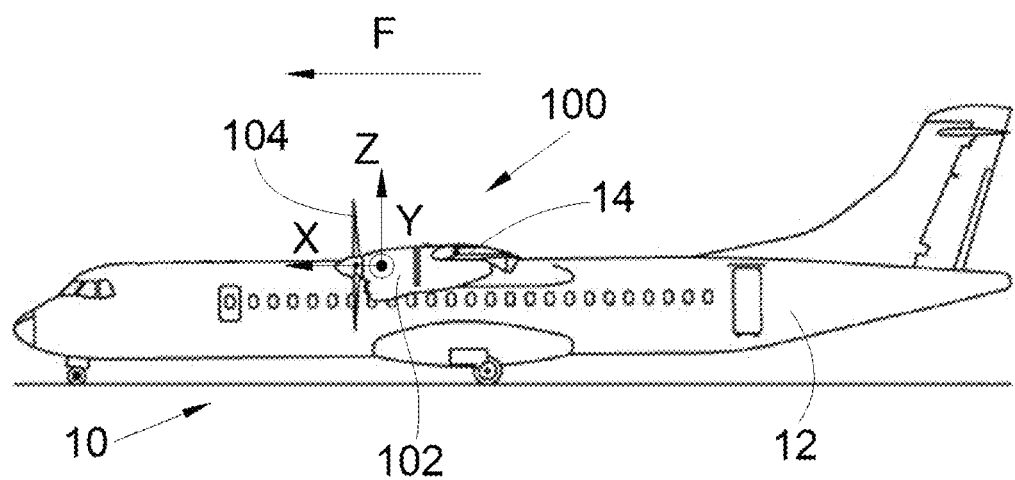
FIG. 1 is a side view of an aircraft having a propulsion assembly according to the invention.

In the following description, terms relating to a position are considered in relation to an aircraft in a position of forward movement, i.e., as shown in FIG. 1 in which the arrow F shows the direction of forward movement of the aircraft.

FIG. 1 shows an aircraft 10 that has a fuselage 12 on either side of which is fastened a wing 14. At least one propulsion assembly 100 according to the invention is fastened beneath each wing 14.

In the following description, and by convention, X denotes the longitudinal axis of the propulsion assembly 100, with positive orientation in the direction of forward movement of the aircraft 10, Y denotes the transverse axis of the propulsion assembly 100, which is horizontal when the aircraft is on the ground, and Z denotes the vertical axis or vertical height when the aircraft is on the ground, these three axes X, Y and Z being mutually orthogonal.

Figure 2:
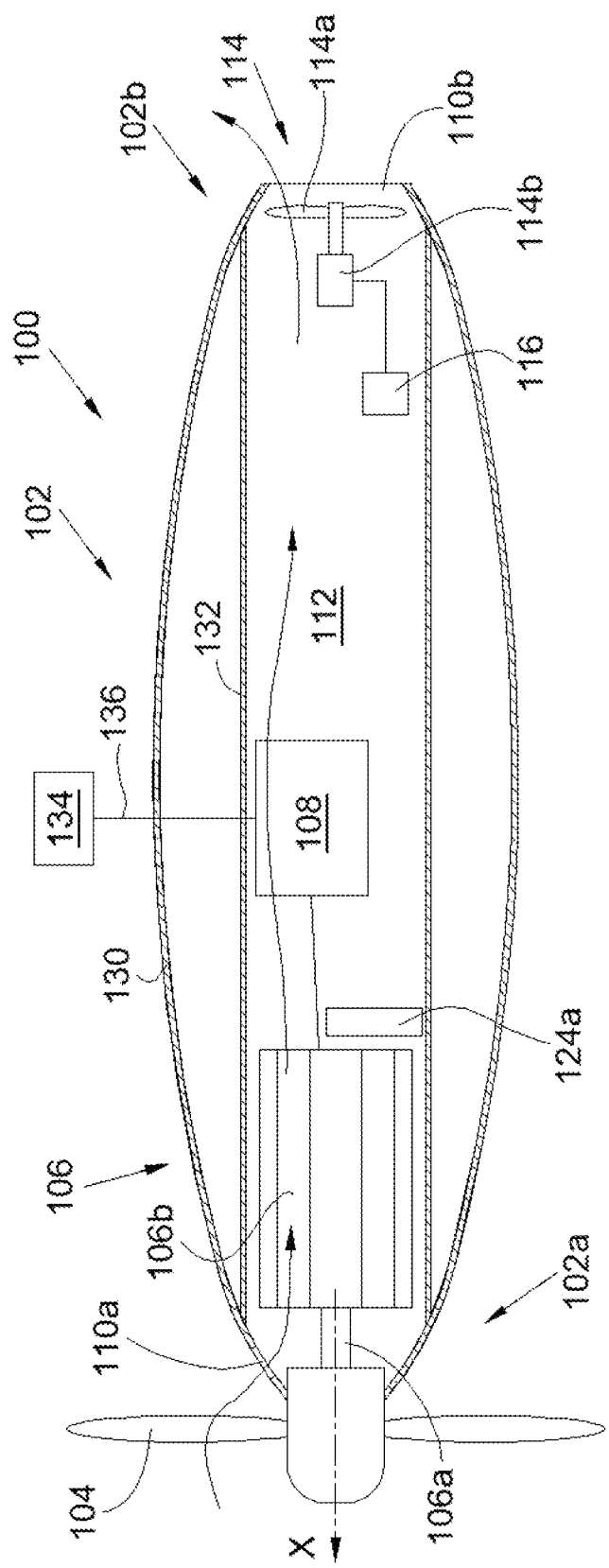
FIG. 2 is a schematic depiction, viewed from the side and in cross section, of a propulsion assembly according to a first variant of the invention.
Figure 3:
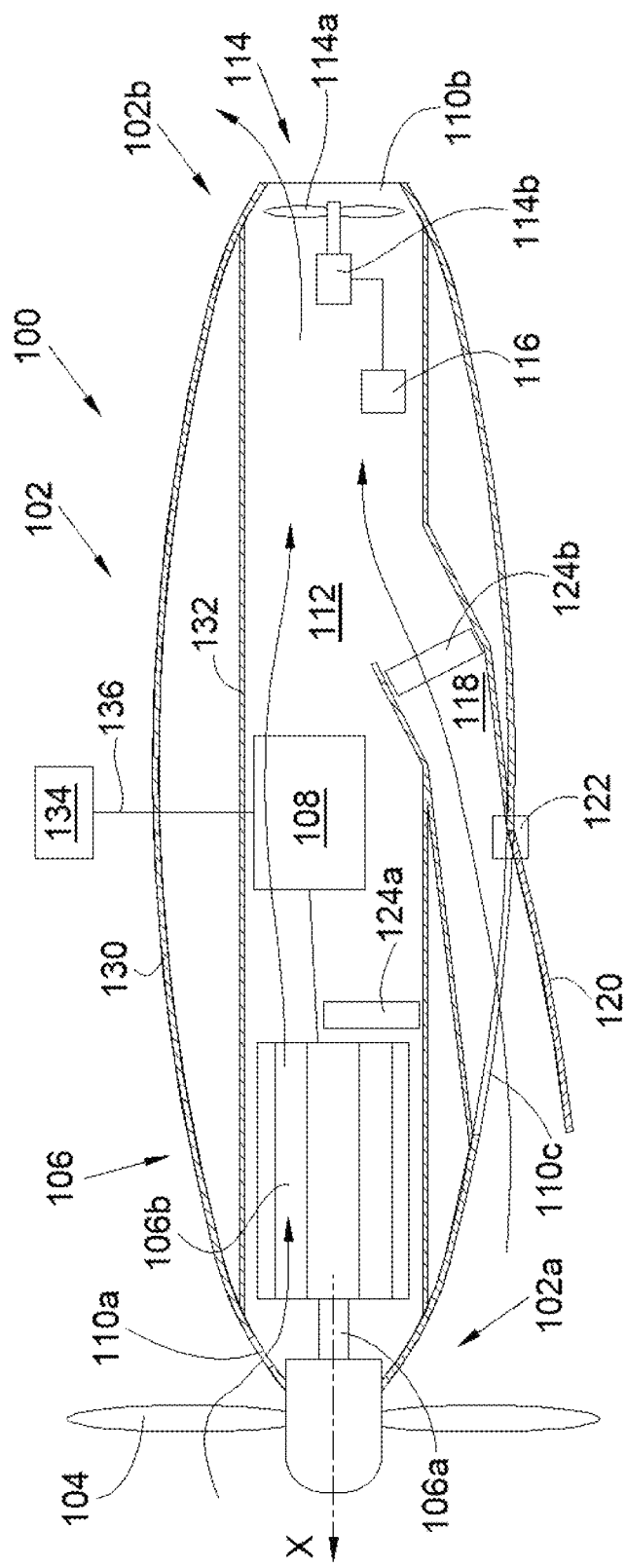
FIG. 3 is a schematic depiction, viewed from the side and in cross section, of a propulsion assembly according to a second variant of the invention.

FIGS. 2 and 3 each show a propulsion assembly 100 according to a variant of the invention.

The propulsion assembly 100 has a nacelle 102 that extends between a front part 102a oriented toward the front of the aircraft 10 and a rear part 102b oriented toward the rear of the aircraft 10.

The nacelle 102 is conventionally composed of panels 130 fastened next to one another on a chassis.

The propulsion assembly 100 also has an inner channel 112 arranged in the nacelle 102. The inner channel 112 may be delimited by inner walls 132 fastened to the chassis as shown in FIGS. 1 and 2, or directly by the panels 130 and the inner channel 112 is then the inner part of the nacelle 102.

The nacelle 102 has a front opening 110a and a rear opening 110b, wherein each opening 110a-b passes through one of the panels constituting the nacelle 102.

The front opening 110a is arranged at the front part 102a and it is shaped so as to collect the air outside the nacelle 102 and cause it to enter inside the nacelle 102, and more precisely inside the inner channel 112, and the rear opening 110b is arranged at the rear part 102b and it is shaped so as to cause the air present in the nacelle 102, and more precisely inside the inner channel 112, to exit toward the outside of the nacelle 102.

The inner channel 112 thus extends between the front opening 110a and the rear opening 110b and channels fresh outside air from the front opening 110a to the rear opening 110b as shown by the arrows in FIGS. 2 and 3.

The propulsion assembly 100 also has a propeller 104 mounted so as to be able to move in rotation in front of the nacelle 102, i.e., in front of the front part 102a, and driven in rotation by an electric motor 106. To this end, the electric motor 106 has a driveshaft 106a mechanically connected to the propeller 104 so as to cause it to rotate about its axis that is coincident in this case with the longitudinal axis X.

The electric motor 106 is housed in the nacelle 102, and more particularly, in the inner channel 112.

In order to generate the electric current necessary for the operation of the electric motor 106, the propulsion assembly 100 has a fuel cell 108 generating an electric current from dihydrogen and dioxygen. The fuel cell 108 is also disposed in the inner channel 112 so as to make it possible, inter alia, to take the dioxygen necessary for its operation, from the air present in the inner channel 112. The dihydrogen is stored in a tank 134 provided for this purpose in the aircraft 10 and a supply pipe 136 transfers the dihydrogen to the fuel cell 108.

By disposing the electric motor 106 and the fuel cell 108 in the inner channel 112, the outside air that circulates therein ensures the at least partial cooling of the electric motor 106 and of the fuel cell 108.

In the event of a dihydrogen leak at the fuel cell 108, the dihydrogen that could escape is then mixed with the air present in the inner channel 112 so as to be expelled at the rear opening 110b.

When the aircraft 10 is in flight, the flow of air that passes through the nacelle 102 is generated naturally as a result of the forward movement of the aircraft 10 and the position of the openings 110a-b. The outside air then circulates naturally from the front toward the rear, cooling the electric motor 106 and the fuel cell 108 that are present in the inner channel 112 and, in the event of a leak, the dihydrogen that is mixed with the air is also evacuated toward the outside.

The propulsion assembly 100 also has a motorized fan 114 that comprises fan blades 114a and a motor 114b, in particular, an electric motor. The motorized fan 114 is arranged at the rear part 102b so as to draw in the air, and possibly the dihydrogen, present in the inner channel 112 and to expel the present air, and possibly dihydrogen, to the outside of the nacelle 102 through the rear opening 110b. The fan blades 114a are, for example, disposed just upstream of the rear opening 110b.

The rotation of the fan blades 114a therefore ensures forced drawing-in of the air at the front opening 110a and forced delivery of the air at the rear opening 110b.

In order to command the starting and stopping of the motorized fan 114, the propulsion assembly 100 also has a control unit 116 arranged for this purpose.

Thus, whether the aircraft 10 is in flight or on the ground, the electric motor 106 and the fuel cell 108 are cooled, and possible traces of dihydrogen are evacuated.

In the embodiments presented in FIGS. 2 and 3, the propulsion assembly 100 also has at least one heat exchanger 124a that is also mounted in the inner channel 112. The one or more heat exchangers 124a transfer heat energy from a hot fluid to a cold fluid constituted of the air circulating in the inner channel 112.

The hot fluid may come from any apparatus requiring cooling; it may, for example, be a heat transfer fluid coming from the electric motor 106 or from the fuel cell 108 via appropriate pipes.

The heat exchanger 124a is in this case disposed just behind the electric motor 106, but it can of course be disposed elsewhere in the inner channel 112 depending on the requirements.

In the embodiments presented in FIGS. 2 and 3, the electric motor 106 is passed through by passage channels 106b extending through the electric motor 106 from the front to the rear of the electric motor 106. These passage channels 106b are thus open so as to let the flow of air coming from the front opening 110a and directed toward the rear opening 110b pass.

In the variant in FIG. 3, the nacelle 102 has a lateral opening 110c, i.e., an opening between the front opening 110a and the rear opening 110b, and therefore on the periphery of the nacelle 102, passing through one of the panels constituting the nacelle 102.

The propulsion assembly 100 then has an additional channel 118 that extends between the lateral opening 110c and the inner channel 112, progressing from the front toward the rear of the nacelle 102. Thus, the additional channel 118 collects the outside air via the lateral opening 110c and conducts it as far as the inner channel 112 before reaching the rear opening 110b.

In the embodiment presented in FIG. 3, the propulsion assembly 100 has at least one heat exchanger 124b that is mounted in the additional channel 118. As above, the one or more heat exchangers 124b transfer heat energy from a hot fluid to a cold fluid constituted of the air circulating in the additional channel 118.

The hot fluid may come from any apparatus requiring cooling; it may, for example, be a heat transfer fluid coming from the electric motor 106 or from the fuel cell 108 via appropriate pipes.

In this case, the propulsion assembly 100 has a door 120 that is mounted so as to be able to move between a closed position in which it shuts off the lateral opening 110c and an open position in which it does not shut off the lateral opening 110c. Thus, in the closed position, the outside air does not enter the additional channel 118 and in the open position the outside air enters the additional channel 118. The open position can be implemented, for example, when the aircraft 10 is on the ground and the quantity of outside air coming from the front opening 110a is not sufficient for the requirements. The closed position is preferentially implemented when the aircraft 10 is in flight and the quantity of outside air coming from the front opening 110a is sufficient for the requirements. Preferentially, the door 120 is mounted so as to be able to move in rotation on the panels 130 about hinges.

The propulsion assembly 100 also comprises actuation means 122 that are controlled by the control unit 116 and that are arranged to move the door 120 alternately from the open position to the closed position. The actuation means 122 comprise, for example, a motor that causes the door 120 to pivot in one direction so as to cause it to pass into the open position and in the opposite direction so as to cause it to pass into the closed position.

According to one exemplary embodiment, the control unit 116 comprises, connected by a communication bus: a processor or CPU (central processing unit); a random access memory (RAM); a read-only memory (ROM), for example a flash memory; a data storage device, such as a hard disk drive (HDD), or a storage medium reader, such as an SD (secure digital) card reader; at least one communication interface allowing the control unit 116 to interact with equipment of the avionics of the aircraft 10, in particular the motor 114b and the actuation means 122.

The processor is capable of executing instructions loaded into the RAM from the ROM, from an external memory (not shown), from a storage medium, such as an SD card, or from a communication network (not shown). When the control unit 116 is powered up, the processor is capable of reading instructions from the RAM and executing them. These instructions form a computer program that causes the implementation, by the processor, of the behaviors, steps and algorithms described here.

All or some of the behaviors, steps and algorithms described here may thus be implemented in software form by executing a set of instructions using a programmable machine, such as a DSP (digital signal processor) or a microcontroller, or be implemented in hardware form by a machine or a dedicated component (chip) or a dedicated set of components (chipset), such as an FPGA (field-programmable gate array) or ASIC (application-specific integrated circuit). In general, the control unit 116 comprises electronic circuitry arranged and configured to implement the behaviors, steps and algorithms described here.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:
    a nacelle extending between a front part and a rear part, wherein the nacelle has a front opening at the front part and a rear opening at the rear part,
    a propeller mounted so as to be able to move in rotation in front of the nacelle,
    an electric motor arranged to drive said propeller in rotation,
    a fuel cell generating an electric current for the electric motor from dihydrogen,
    an inner channel arranged in the nacelle and extending between the front opening and the rear opening, wherein the electric motor and the fuel cell are disposed in the inner channel,
    a motorized fan arranged at the rear part so as to draw in the air present in the inner channel and expel it to the outside of the nacelle through the rear opening, and
    a control unit arranged to command the starting and stopping of the motorized fan.

2. The propulsion assembly as claimed in claim 1, wherein the nacelle has a lateral opening, and wherein the propulsion assembly has an additional channel extending between the lateral opening and the inner channel and progressing from the front toward the rear of the nacelle.

3. The propulsion assembly as claimed in claim 2, which has a door mounted so as to be able to move between a closed position in which it shuts off the lateral opening and an open position in which it does not shut off the lateral opening and actuation means controlled by the control unit and arranged to move the door alternately from the open position to the closed position.

4. The propulsion assembly as claimed in claim 2, which has at least one heat exchanger mounted in the additional channel.

5. The propulsion assembly as claimed in claim 1, which has at least one heat exchanger mounted in the inner channel.

6. An aircraft having at least one propulsion assembly as claimed in claim 1.

* * * * *